United States Patent [19]

Vikre

[11] 4,350,300

[45] Sep. 21, 1982

[54] IRRIGATION SYSTEM AND CONSTANT VOLUME SPRINKLER HEAD THEREFOR

[76] Inventor: Merle A. Vikre, 32 Windward Way, Gulf Harbors New Port Richey, Fla. 33552

[21] Appl. No.: 143,413

[22] Filed: Apr. 24, 1980

Related U.S. Application Data

[63] Continuation-in-part of Ser. No. 199,094, Oct. 20, 1980, and Ser. No. 971,038, Dec. 19, 1978, Pat. No. 4,231,523, which is a continuation of Ser. No. 765,266, Feb. 3, 1977, abandoned, said Ser. No. 199,094, is a continuation of Ser. No. 000,069, Jan. 2, 1979, abandoned.

[51] Int. Cl.³ .......................... B05B 1/26; B05B 1/30
[52] U.S. Cl. ................................. 239/396; 239/454; 239/506; 239/533.1
[58] Field of Search ............... 239/177, 710, 390, 396, 239/397, 454, 506, 507, 513-515, 524, 533.1, 533.13, 533.14, 570, 571, DIG. 1; 169/37-41; 138/43, 45, 46

[56] References Cited

U.S. PATENT DOCUMENTS

| | | | |
|---|---|---|---|
| Re. 24,534 | 9/1958 | Dahl | 138/45 |
| 458,607 | 9/1891 | Weiss | 239/222.17 |
| 575,417 | 1/1897 | Cyrenius | 169/39 |
| 868,366 | 10/1907 | Scott | 169/39 |
| 1,963,424 | 6/1934 | Smith | 138/46 |
| 2,389,134 | 11/1945 | Brown | 138/45 |
| 2,393,328 | 1/1946 | Mahone | 239/506 X |
| 2,454,929 | 11/1948 | Kempton | 138/45 |
| 2,460,647 | 2/1949 | Miller | 138/45 |
| 2,488,234 | 11/1949 | Perry | 239/222.17 |
| 2,775,984 | 1/1957 | Dahl | 138/45 |
| 2,878,836 | 3/1959 | Binks | 239/533.13 X |
| 2,910,093 | 10/1959 | Dahl | 138/46 |
| 3,006,558 | 10/1961 | Jacobs | 239/222.17 X |
| 3,014,667 | 12/1961 | McLean et al. | 239/427 |
| 3,036,782 | 5/1962 | Windsor | 239/452 |
| 3,077,903 | 2/1963 | Honsinger | 138/45 |
| 3,121,445 | 2/1964 | Wisniewski | 138/45 |
| 3,138,177 | 6/1964 | Cutler | 138/46 |
| 3,141,477 | 7/1964 | Campbell et al. | 138/45 |
| 3,592,237 | 7/1971 | Borschers | 138/43 |
| 3,630,236 | 12/1971 | Diggs | 138/45 |
| 3,667,673 | 6/1972 | Knudsen | 239/1 |
| 3,779,462 | 12/1973 | Bruninga | 239/390 X |
| 3,782,637 | 1/1974 | Crumpacker | 239/512 X |
| 3,833,019 | 9/1974 | Diggs | 138/45 |
| 3,837,363 | 9/1974 | Meronek | 239/533.13 X |
| 3,908,694 | 9/1975 | Spears | 138/46 X |
| 3,951,379 | 4/1976 | Cornelius | 138/45 X |
| 4,059,228 | 11/1977 | Werner | 239/533.1 X |
| 4,091,996 | 5/1978 | Nelson | 239/177 |

FOREIGN PATENT DOCUMENTS

| | | | |
|---|---|---|---|
| 586135 | 12/1924 | France | 239/386 |
| 1342023 | 9/1963 | France | 239/515 |
| 1492784 | 7/1967 | France | 239/524 |
| 103160 | 11/1962 | Netherlands | 239/383 |
| 146688 | 7/1920 | United Kingdom | 239/515 |
| 471273 | 9/1937 | United Kingdom | 239/382 |
| 127108 | 4/1959 | U.S.S.R. | 239/DIG. 1 |

Primary Examiner—Andres Kashnikow
Attorney, Agent, or Firm—Merchant, Gould, Smith, Edell, Welter & Schmidt

[57] ABSTRACT

The disclosure is directed to a spray head device for use in a center pivot irrigation system which is capable of operation under high or low water pressure. The spray head device includes an enclosed housing adapted for connection to a source of water, and which houses water jet apparatus constructed to issue a jet of water and sized for a predetermined range of volume flow. A frame connected to the housing suspends a diffuser element in a position where it is impinged by the jet of water to disperse the water into a flow pattern of predetermined configuration. A resilient washer is carried by the water jet apparatus to provide a substantially constant volume output. The water jet apparatus and diffuser element are removably and interchangeably carried by the enclosed housing and frame, respectively, whereby the rated volume flow of the spray head device may be varied. Also disclosed is a unique diffuser element having an undersurface that tapers axisymmetrically to a point and is formed with a plurality of grooves that extend radially outward to the peripheral edge of the element. The frame includes a pair of spaced, opposed side members that obstruct the flow pattern. To minimize this problem, the opposed side members include longitudinal edges that taper to a point, and the undersurface of the diffuser element is formed with diametrically opposed regions void of the radially extending grooves which are respectively disposed adjacent the opposed side members.

49 Claims, 12 Drawing Figures

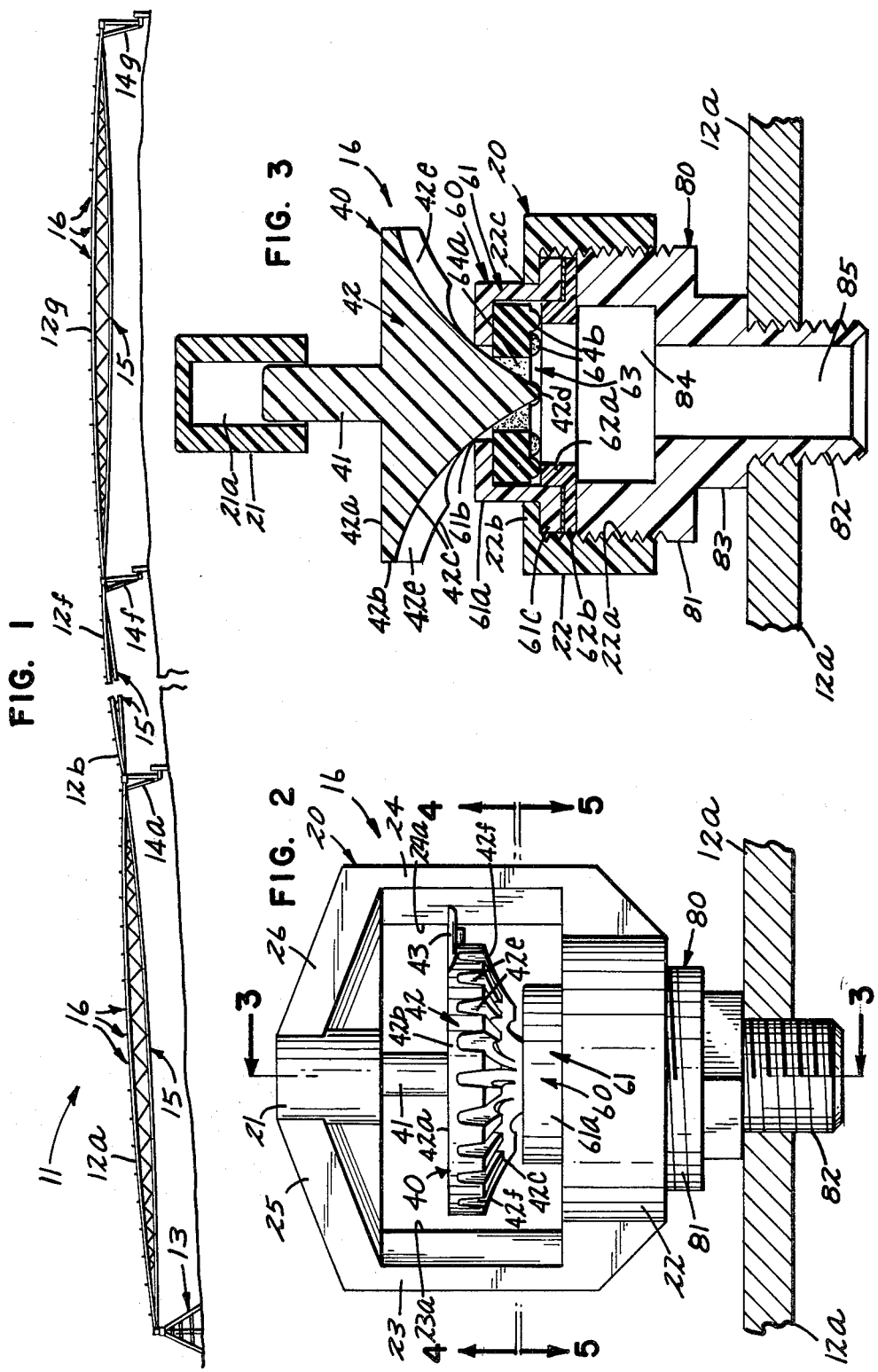

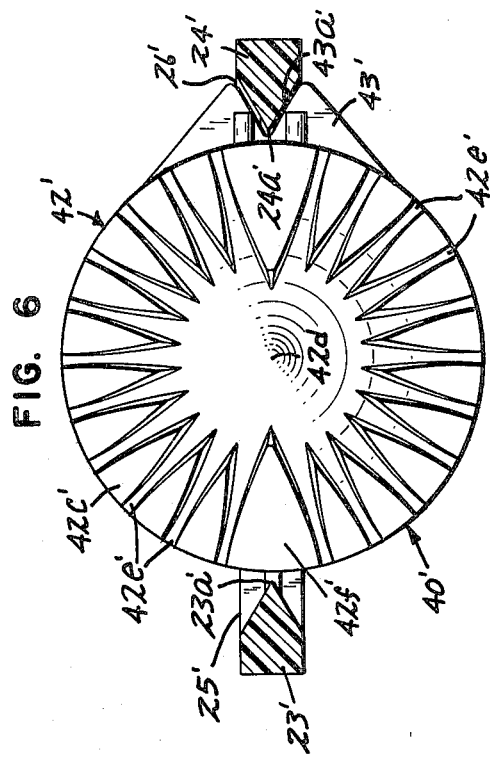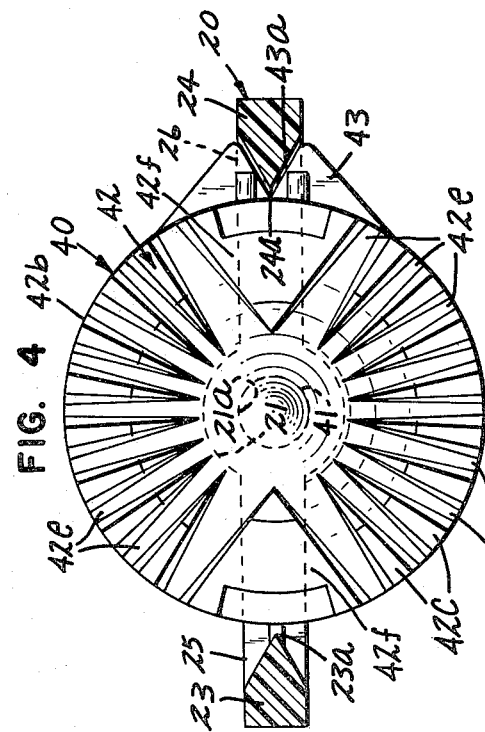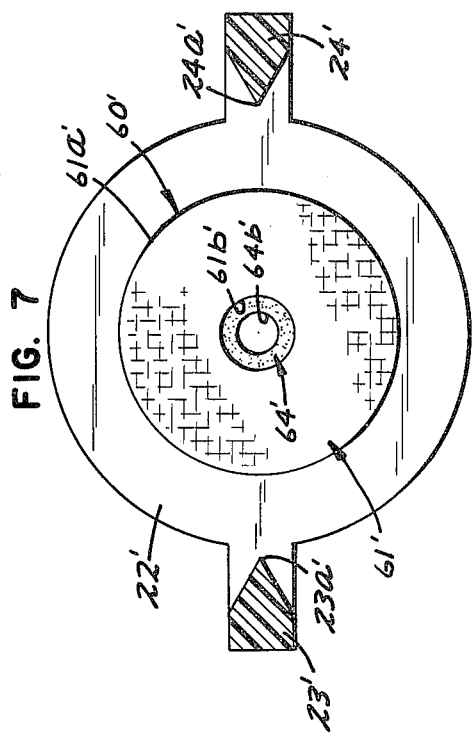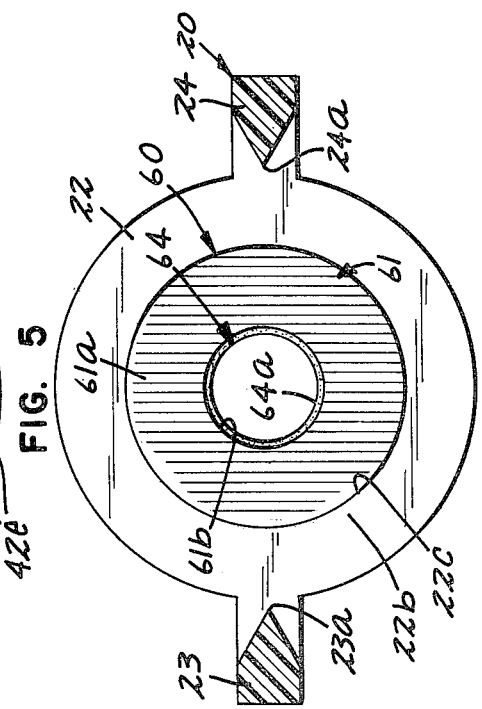

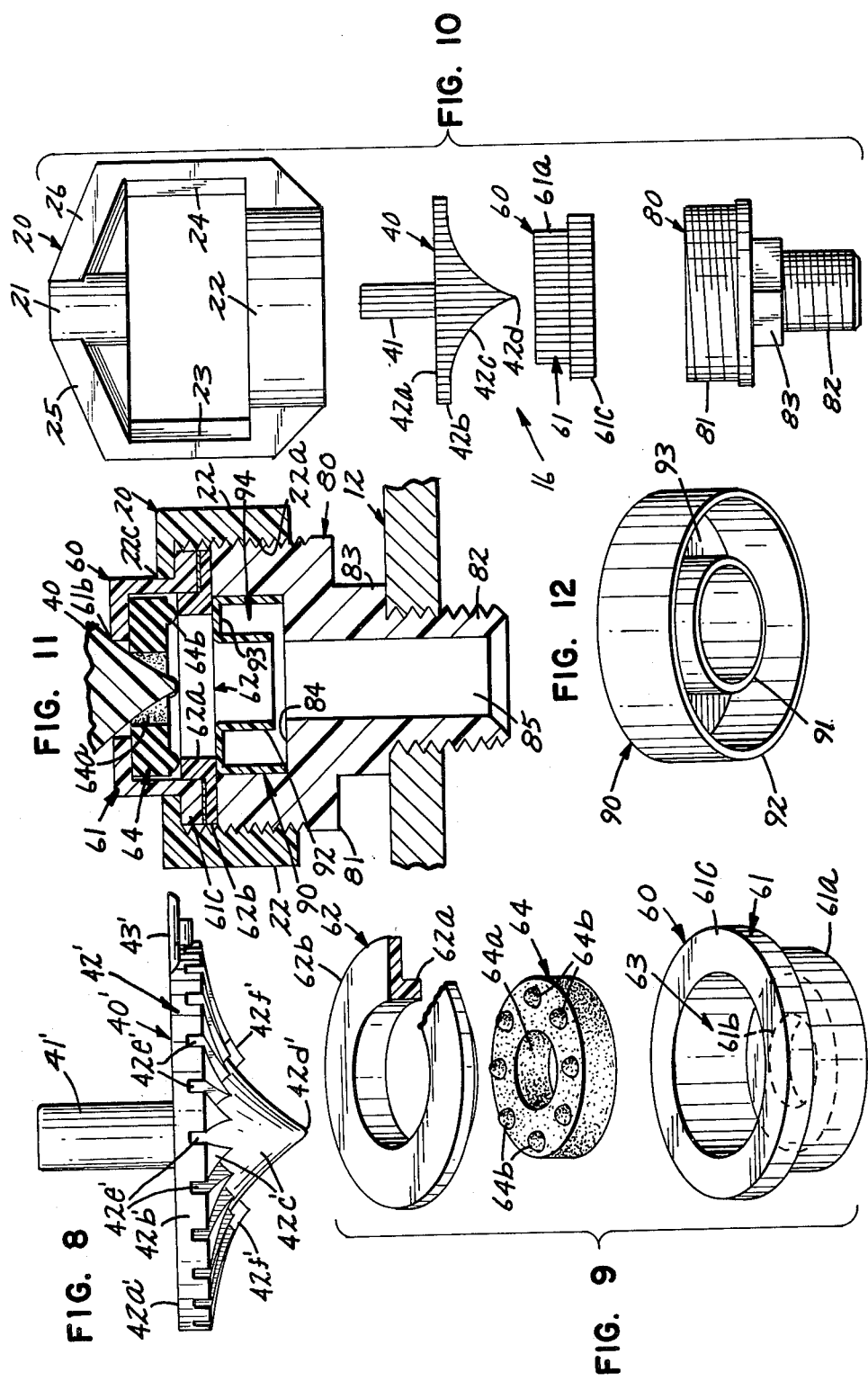

IRRIGATION SYSTEM AND CONSTANT VOLUME SPRINKLER HEAD THEREFOR

This is a continuation-in-part application of my patent application entitled "Irrigation System and Volume Control Valve Therefor", filed on Dec. 19, 1978, Ser. No. 971,038, which issued on Nov. 4, 1980 as U.S. Pat. No. 4,231,523, and which was a continuation of Ser. No. 765,266 filed Feb. 3, 1977, now abandoned; and my copending patent application entitled "Irrigation System and Constant Volume Sprinkler Head Therefor", filed Oct. 20, 1980, Ser. No. 199,094, which is a continuation of Ser. No. 000,069, filed on Jan. 2, 1979, now abandoned.

The invention is generally related to water distributing systems and devices, and is specifically directed to a center-pivot, field irrigation system capable of operating at low or high water pressure, and a constant-volume sprinkler head for such irrigation systems.

Center-pivot irrigation systems typically comprise an extremely long water conduit "arm" which is pivotally connected at one end to a source of water under pressure. The conduit arm is carried in an elevated position, usually by a plurality of radially spaced wheeled towers which are powered by hydraulic, pneumatic or electrical motors to rotatably sweep the conduit arm through and over a circular field. The conduit arm includes a predetermined number of water sprinkling heads, which are radially spaced over its length and constructed to distribute a spray of water on the circular or annular field area over which they pass.

Center-pivot irrigation systems have strongly and successfully established themselves in the farming community. Although initially expensive, they presently represent one of the most efficient manners of irrigation, insuring that most of the crop receives an adequate supply of water and thus increasing crop yield.

For some period of time, centerpivot irrigation systems have operated at reasonably high water pressure, typically on the order of 70 psi. This has been environmentally and economically unsound, since such levels of operation require more elaborate pumping equipment, as well as conduit and sprinkler heads capable of withstanding such pressures. High pressure equipment is more expensive to operate due to fuel consumption. Further, the extreme pressure causes substantial evaporation of the water for at least two reasons. First, the water is often propelled through the air for significant distances where higher pressures are used, and the more exposure to the air, particularly when it is dry, the greater the degree of evaporation. Secondly, irrigation systems of this type often create a spray by directing a high velocity water jet against a deflector. The resulting spray is a fine mist, at least in part, which is highly subject to evaporation before it reaches the ground, and the problem is severely compounded by windy conditions, which also tend to blow the spray away from the intended area.

Consequently, many of the newer systems have been designed to operate at low water pressure, typically on the order of 20 psi. Lower pressures clearly have the advantage of less operating cost, and there is usually less evaporation under still conditions. However, evaporation and misdirection of the spray pattern have continued to be a problem under windy conditions, resulting in erratic and nonuniform distribution of water over the field. Nonuniform distribution is even more pronounced where differences in elevation occur in the field even where such differences are not great. A severe pressure drop occurs wherever there is any degree of elevational difference in the conduit arm. This results in poor water distribution in the high areas of the field, whereas over watering occurs in the low spots. Thus, the field becomes "spotted" with areas which have received too little or too much irrigation, and much or all of the advantage of low pressure irrigation is lost. This is not, of course, conducive to optimum crop yield.

The inventive irrigation system and sprinkler head are the result of an endeavor to develop a low pressure center-pivot system capable of uniformly distributing water over the field notwithstanding differences in elevation or windy conditions, and that overcomes high percentage water losses due to evaporation.

The irrigation system comprises an elevated conduit arm that is pivotally connected to a stationary point (usually the well pipe), and is powered to rotatably sweep through and over the field. The system further comprises a plurality of sprinkler heads spaced over the length of the conduit arm, each of which is constructed to create a spray formed from water droplets that are large enough to resist being blown off course by the wind, but not so large as to damage farm plants that may be small and fragile after sprouting and during early development.

Because the area of a circular field increases exponentially as the field radius increases, the system must be properly designed to insure that the sprinkler heads have the capacity to cover the entire field with a sufficient volume of water, and that this predetermined volume is uniformly distributed even without elevation differences or windy conditions. Thus, assuming that the sprinkler heads are equidistantly spaced, each successive head in the radially outward direction generally must have a greater output capacity since the annular area which it overlies is greater than the annular area which next precedes it. Stated otherwise, although the annular band width of all sprinkler head areas may be essentially constant with equidistant spacing, each successive area nevertheless increases appreciably because its effective radius increases. Accordingly, the output capacity of each sprinkler head must be chosen to deliver the proper volume of water per unit of time based on the specific area which it overlies and serves.

Although I prefer increasing the output capacity of successive sprinkler heads as a function of their radial distance from the pivot point, it would be possible to use sprinkler heads of the same output capacity and decrease the spacing therebetween as a function of increasing radial distance from the pivot point. Because the output capacity of my unique sprinkler head can be varied much more easily (due to interchangeability of control components) than can sprinkler head spacing on the conduit arm, the equidistant spacing approach is strongly preferred. This is particularly so since proper water distribution is necessarily conditioned on geographic area, annual rainfall, type of crop and the like. Further, many existing systems already have equidistantly spaced sprinkler heads but can be readily converted to the inventive system.

Having designed the system to be capable of uniform and sufficient water distribution over the entire field, the problem of pressure fluctuations due to differences in elevation can be overcome on an individual sprinkler head basis. This is accomplished through the use of a volume control device within the sprinkler head that maintains a constant volume output even in the face of water pressure fluctuations in the conduit arm. Thus, assuming that water under a predetermined minimum pressure of sufficient volume is always supplied to the conduit arm, the individual sprinkler heads respond to the delivered pressure and distribute the same volume of water in the same spray pattern throughout all phases of the operation.

The inventive sprinkler head disclosed herein utilizes a diffuser or dispersion member that creates a spray pattern of completely or partially circular configuration of substantial circumference that uniformly covers the area below with a minimum of water loss due to evaporation or being blown off course by strong wind. This is accomplished by providing means for creating an upward jet of water within each sprinkler head, and causing the jet of water to impinge on the diffuser. The diffuser is also of generally circular configuration but is maintained in a nonrotating position. Its impinged undersurface is provided with a plurality of generally radially extending grooves that are disposed to deflect the upwardly moving jet of water radially outward into a flow pattern of desired configuration.

The grooves may be formed in less than the entire undersurface of the diffuser to generate flow patterns of varying configuration to suit the particular needs of the field in question.

The inventive sprinkler head comprises four components, three of which are formed from an acetal copolymer. The fourth component is a resilient washer through which the jet of water passes, and which is deformable to vary the central aperture as water pressure changes, thus maintaining a constant volume output.

As pointed out above, the output capacity of each sprinkler head must be chosen to deliver the proper volume of water per unit of time based on the specific area which it overlies and serves. The inventive sprinkler head is constructed so that the four components are completely interchangeable, permitting a wide range of output capacities to be obtained with a minimum number of interchangeable parts. Preferably, output capacities of the sprinkler heads should vary from 1½ to 20 gallons per minute by increments of ½ galon per minute. This is easily accomplished by four different sized, matched sets of diffusers and diffuser seats, and a like number of different sized resilient washers. Preferably, each matched pair of diffusers and diffuser seats are color coded for instantaneous recognition of a range of output capacities. The grooves in the undersurface of each of the diffusers are sized relative to the range of output capacities to accomplish optimum spraying with minimum water losses. The grooves create a flow pattern of droplets which, as pointed out above, are large enough to resist being blown off course by the wind, but not so large as to damage farm plants during early development. Generally, the grooves are made wider and deeper as a function of increasing output capacity.

The inventive sprinkler head and center-pivot irrigation system in which it is used successfully combat the problem of uneven water distribution and spotty crop production due to differences in elevation, windy conditions, friction loss and water evaporation. Further, since the sprinkler head is designed with full component interchangeability in mind, an irrigation system which is custom designed to the conditions of a specific field can be assembled and installed quickly and easily.

The inventive sprinkler head and irrigation system include a number of additional advantageous structural features, which will become apparent from the drawings and description below.

BRIEF DESCRIPTION OF THE DRAWINGS

FIG. 1 is a fragmentary view in side elevation of a low-pressure, center-pivot irrigation system embodying the inventive concept;

FIG. 2 is an enlarged view in side elevation of a low pressure, center-pivot irrigation system utilizing the inventive sprinkler head;

FIG. 3 is a sectional view taken along the line 3—3 of FIG. 2;

FIG. 4 is an enlarged sectional view taken along the line 4—4 of FIG. 2, showing in particular the groove configuration on the undersurface of the diffuser;

FIG. 5 is an enlarged sectional view taken along the line 5—5 of FIG. 2, showing in particular the outlet side of the water jet means;

FIG. 6 is a view similar to FIG. 4, showing in particular a different groove configuration formed in the undersurface of a diffuser;

FIG. 7 is a view similar to FIG. 5, showing in particular the outlet side of the water jet means;

FIG. 8 is a view in side elevation of the diffuser of FIG. 6;

FIG. 9 is an enlarged exploded perspective view of the diffuser seating member assembly including a resilient washer; and FIG. 10 is an exploded view in side elevation of the four components making up the inventive sprinkler head.

FIG. 11 is a fragmentary sectional view similar to FIG. 3, showing in particular an insert member for the housing that is designed to absorb the impact of water travelling at high velocity; and FIG. 12 is an enlarged perspective view of the insert member.

DESCRIPTION OF THE PREFERRED EMBODIMENT

With initial reference to FIG. 1, a center-pivot irrigation system constructed for operation at low pressures is represented generally by the numeral 11. Irrigation system 11 consists of a long water conduit "arm", which is made up of a plurality of conduit sections 12a–12g which are serially connected to permit the flow of water over the entire length. One end of the conduit arm is pivotally connected to a source of water under pressure, such as a well pipe, and this connection is generally designated 13 in FIG. 1. The conduit arm is carried in an elevated position by a plurality of "towers" π14a, 14g as such, there are the same number of towers as conduit sections, thus providing adequate support for the entire length of the water conduit arm. Supportive structure for each of the conduit sections 12a–12g is generally designated 15 in FIG. 1.

As is well known in the art, the wheeled towers 14a, 14g are motivated hydraulically, pneumatically or electrically in a coordinated manner so that the conduit arm rotatably sweeps through and over a field relative to the center pivot 13.

Each of the conduit sections 12a–12g includes a plurality of water sprinkling or spray heads 16 which are equadistantly spaced over the entire length of the water conduit arm. As constructed, the irrigation system 11 is designed to irrigate a circular field having diameters up to ½ mile. With a field of this size, the water conduit arm has a radial length of 1400 feet, and each of the seven conduit sections 12a-12g is 200 feet long and includes 20 equadistantly spaced spray heads 16 to distribute water over its associated annular area. Thus, in this particular embodiment, the irrigation system 11 includes 140 spray heads which are designed to deliver a predetermined volume of water as described in further detail below. It will be appreciated to the person of ordinary skill that this irrigation system is exemplary, and it is possible for the system to be of varying lengths, depending on the field size, with varying numbers of conduit sections. The irrigation system may also include a greater or lesser number of spray heads having different volume flow capabilities, the objective being to distribute a predetermined volume of water onto the field in a given amount of time as uniformly as possible.

The circumferential distance traveled by the spray heads 16 varies significantly based on radial distance from the center pivot 13. Assuming that each of the conduit sections 12a-12g is 200 feet in length, the outermost tower 14g would travel approximately 4,398 feet in one revolution of the conduit arm, whereas the innermost tower 14a travels only 628 feet through the same revolution. Thus, the tower 14g travels 7 times the distance traveled by tower 14a, and a comparison of the volume of water distributed by a spray head 16 proximate the tower 14g and one proximate the tower 14a must reflect the difference in travel. Generally, where spray heads 16 are equidistantly spaced over the length of the conduit arm, as with the irrigation system 11, the water distributing capacity of a given spray head must be established as a function of its radial distance from the center-pivot 13. In the preferred embodiment, each spray head 16 has a water distributing capacity which is directly related to the distance it travels and the annular area which it irrigates, and its capacity in this respect is therefore greater than the spray head 16 which is radially inboard and less than that of the spray head 16 which is next radially outboard. It may also be possible to arrange the spray heads 16 in groups or sets of two or three having the same water distributing capacity, with the set capacity increasing as a function of radial distance from the center pivot.

Where the spray heads 16 have different water distributing capacities, as in the preferred embodiment, identifying means are provided which are visually discernable from a distance. Such identification means are described in detail below. The objective of spray head identification is for the user to be capable of quickly identifying the specific position of a specific spray head simply by observation. This is highly important where the system is custom designed to a particular field, and the agricultural user is not well versed on water distributing capacity in terms of outlet orifice sizes, inlet pressures, volume control rates and the like.

FIGS. 2-5, 9 and 10 show the detailed structural configuration of one of the spray heads 16. Each spray head 16 comprises four components; viz., a frame 20, a diffuser 40, a water jet means 60 and a threaded coupling 80.

With reference to FIGS. 2-5 and 10, the frame 20 is integrally formed from plastic material which is preferably an acetal copolymer and comprises an upper bearing member 21 which is carried coaxially above and spaced from a lower circular housing member 22. The components 21, 22 are held in this spaced relation by a pair of vertical side members 23, 24 and a pair of angular struts 25, 26, respectively.

As particularly shown in FIG. 3, bearing member 21 is circular in transverse cross section, closed at the top and defines a vertically oriented recess 21a sized and constructed to receive a shaft 41 of a diffuser 40. The relative sizing of the recess 21a and shaft 41 are chosen to permit low friction, vertical reciprocal movement of the shaft 41 within recess 21a.

The struts 25, 26 incline downward from opposite upper sides of the bearing member 21 at a modest angle into integral connection with the side members 23, 24, respectively.

With reference to FIGS. 2, 4, and 5, each of the side members 23, 24 is beveled or tapered toward its inner edge, defining a longitudinal sharp edge 23a, 24a. These edges 23a, 24a cause the spray pattern to divide more easily without turbulence as it is generated radially outward by the diffuser 40.

With reference to FIGS. 2 and 3, the circular housing member 22 is cylindrical in shape, and the lower ends of the side members 23, 24 are integrally connected to opposite sides of its outer circumferential face.

The inner cylindrical face is threaded, as shown at 22a, and an integral, annular flange or wall member 22b extends radially inward from the top edge of member 22 to define a circular bore 22c.

With reference to FIGS. 2-4, the diffuser 40 is also integrally molded from plastic material, preferably an acetal copolymer. The diffuser comprises the shaft 41, which, as described above, is received for reciprocal movement within the recess 21a, and a diffuser element 42. Element 42 is generally circular, defining an upper flat surface 42a from which the centrally disposed shaft 41 projects vertically upward. The diffuser element 42 may take different shapes depending on the spray pattern it is intended to create and the volume flow of water it must handle. Alternatively configurations are described below. However, generally speaking, each of the diffusers 40 defines a circumferential side 42b of predetermined thickness, and a bottom surface 42c which tapers axisymmetrically to a point 42d.

As shown in FIGS. 2 and 4, a thin tab member 43 projects radially outward from the side 42b and in the same plane as the surface 42a. The tab member 43 is formed with a V-groove 43a that is sized and configured to receive the inner bevelled edge of the side member 24, thus preventing rotation of the diffuser 40.

With continued reference to FIGS. 2 and 4, a plurality of grooves 42e are formed in the undersurface 42c of element 42, extending upward and radially outward of the point 42d. Grooves 42e generally follow the contoured and axisymmetrically tapered undersurface 42c, so that the impinging, upwardly directed jet of water strikes the point 42d, is divided, and then is distributed upwardly and radially outward outward.

For the diffuser element 42, the grooves 42e are relatively deep (FIG. 2) and relatively wide (FIG. 4). Generally speaking, and as pointed out above, the grooves are made wider and deeper as a function of increasing output capacity of the sprinkler head 16, the objective being to create a flow pattern of droplets which resist influence by the wind while remaining small enough to act as a gentle rain.

It will also be observed in FIG. 4 that the grooves 42e are not necessarily of the same size, and that they do not occupy the entire undersurface 42c of the element 42. Rather, there are two residual, generally triangular areas 42f that are disposed in diametrical opposition adjacent the side members 23, 24. Because these triangular areas 42f are not formed with grooves, the water striking the diffuser element 42 is substantially diverted away from the side members 23, 24.

The residual areas 42f accomplish two functions. First, in diverting water away from side members 23, 24, they eliminate the turbulence and pattern destruction which would otherwise occur if the water were to strike side members 23, 24. Second, the residual areas 42f permit spray patterns of different configuration to be created, depending on the particular needs of the underlying area to be irrigated. By varying the size and position of the residual areas 42f, it is possible to reduce the size of the spray pattern to an hourglass configuration, for example, or to block the flow so that the pattern extends radially outward at only one side of the diffuser 40. This permits the water to be directed to areas needing greater coverage, resulting in better utilization of both water and energy.

The grooves 42c next adjacent the residual areas 42f may be slightly larger than the other grooves 42c, as shown in FIG. 4, to assist in formation of the flow pattern and in preventing water from falling on the pivot arm 12.

With reference to FIGS. 3, 5, and 9, it will be seen that the water jet means 60 comprises three components; viz., a top element 61 and a bottom element 62 which together define an internal chamber 63, and a resilient washer 64 disposed within the chamber 63. The assembly is shown inverted in FIG. 9.

Top element 61 is generally hat-shaped, defining a cylindrical crown 61a with a central aperture 61b formed through its top surface, and a circular flange 61c that projects radially outward from the crown 61a. As shown best in FIG. 3, the outside diameter of the cylindrical crown 61a conforms generally to the inside diameter of circular bore 22c of housing member 22, and the outer diameter of the annular flange 61c conforms generally to the inside diameter of the threaded surface 22a.

The central aperture 61b defines the outlet for the jet of water, and its diameter is varied from unit to unit to control the volume of water passing through the sprinkler head 16. As shown in FIG. 3, in the "at rest" position, the central aperture 61b receives the lower pointed end of diffuser element 42 and is closed thereby.

Bottom element 62 is similar in configuration to element 61, comprising a cylindrical body 62a open at both axial ends and an annular flange 62b that extends radially outward from the body 62a. The outer diameter of the cylindrical body 62a is chosen to snugly fit within the inner surface of the crown 61a, and the annular flange 62b has an outside diameter identical to that of the flange 61c, permitting it to snugly fit against the threaded surface 22a.

In the assembled position, the elements 61, 62 are adhesively bonded together or ultrasonically welded.

The resilient washer 64 is annular in configuration, defining a central aperture 64a which controls the volume of water passing therethrough as described below. Preferably, the aperture 64a is slightly smaller than the aperture 61b (FIG. 3), permitting a degree of flexibility of the washer 64.

A plurality of hemispherical nibs 64b are integrally formed on the bottom annular face of washer 64. The overall thickness of the washer 64, including the nibs 64b, conforms to the actual depth of chamber 63; and, as seen in FIG. 3, the lower element 62 acts as a retainer to the washer 64 with the components assembled.

The outer diameter of washer 64 is slightly less than the inside diameter of the crown 61a.

With reference to FIGS. 3 and 10, the threaded coupling 80 comprises an upper cylindrical head 81 the outer circumferential surface of which is threaded to mate with the threaded surface 22a, and an externally threaded nipple 82 that is screwed into a selected one of a plurality of threaded bores formed in the conduit arm 12. Disposed between the head 81 and the nipple 82 is a square shank 83 which permits the use of a wrench in installing the sprinkler head 16.

A large cylindrical bore 84 is formed in the threaded coupling 80, communicating with an axial bore 85 that leads upward from the threaded nipple 82 and receives water from the conduit arm 12.

As best shown in FIG. 3, the threaded coupling 80 is sized to urge the water jet means 60 upward against the annular flange 22b to effect a watertight seal.

The threaded coupling 80, as well as the top and bottom elements 61, 62, are also integrally molded from plastic material, preferably an acetyl copolymer. Thus, with the exception of the washer 64, which is formed from a resilient material which may be rubber or a suitable synthetic material, all of the components are formed from plastic, which is capable of withstanding a wide range of temperatures without corrosion.

With reference to FIGS. 5 and 10, the diffuser 40 and water jet means 60 are preferably color-coded to indicate the output capacity of the sprinkler head 16. Each of the components 20, 40, 60, 80 is fully interchangeable with like components. The frame 20 and threaded coupling 80 are identically constructed for each sprinkler head 16. Only the diffuser 40 and water jet means 60 differ structurally so that the water output capacity can be varied from sprinkler head to sprinkler head. Even so, each of the diffusers and seating members 60 is fully interchangeable with like components, notwithstanding variations in the output capacity.

These structural variations within the water jet means 60 reside in the size of the central aperture 61b of the top element 61, the size of the central aperture 64b of resilient washer 64, and the effective thickness of washer 64.

It will be appreciated that a reduction in size of the apertures 61b and 64a will effect a reduction in the volume flow of water through the unit. The size of the central aperture 61b corresponds to the color of the water jet means 60; and, in the preferred embodiment, four different colors are used.

It will also be appreciated that a washer having a lesser effective thickness will be more easily flexed or stressed, and thus will be better capable of controlling the flow through sprinkler heads of lesser volume output capacities. The total thickness of the washer 64 is its effective thickness plus the thickness of the nibs 61b. As discussed above, the total thickness is constant to conform to the depth of chamber 63, and variations in the effective thickness are accompanied by complementing variations in the thickness of the nibs 61b. In addition to permitting variations in the effective thickness, the nibs 61b also space the washer 64 about its supporting surface in such a manner that water pressure is uniformly distributed over the underside of the washer 64 to obtain a uniform flex.

Resilient washers 64 having central apertures 64b which vary in size, and which vary in effective thickness, may be used for a diffuser seating member of a particular color to obtain one-half gallon per minute increments over substantially a five gallon per minute range. In the preferred embodiment, four different sized diffuser seating members 60 of four different colors are used with 38 different resilient washers 64, and as a result the output capacity of the sprinkler heads 16 varies from one and one-half to twenty gallons per minute by increments of one-half gallon per minute.

Reference is made to FIGS. 5 and 7, which are identical views of different sprinkler heads. In FIG. 5, the top element 61 is a central aperture 61b or substantial size, and which would permit output capacities if approximately 15-20 gallons per minute, depending on the size of the aperture 64a and the associated resilient washer 64. The element 61 is depicted as red in FIG. 5.

In FIG. 7, the top element bears the reference numeral 61' and is depicted as yellow. The central aperture 61b' is sized to permit an output capacity of one and one-half to five gallons per minute, depending on the size of the central aperture 64b' of washer 64'.

The diffuser 40 shown in FIG. 4 structurally matches the water jet means 60 of FIG. 5. As noted above, the grooves 42e are relatively wide and deep, and thus are adapted to receive and diffuse a larger volume of water into a substantially circular pattern in droplet form.

FIGS. 6 and 8 show a diffuser 40' that is structurally matched to a water jet means having a top element 61' and a resilient washer 64'. As shown in FIG. 8, the diffuser 40' has a shaft 41' identical to that of the diffuser 40, and a diffuser element 42' which is structurally different. A circumferential side 42b' has a lesser thickness or axial depth, and the axial distance from the surface 42a' to the point 42d' is less than that of the diffuser element 42. Further, the diffuser element 42' has a plurality of grooves 42e' which are more shallow than the grooves 42e; and, with reference to FIG. 6, although the grooves 42e' at their radially innermost point are as wide as the grooves 42e at the same point, they taper or converge toward the side 42b', at which point they are relatively narrow. This permits the diffuser element 42' to generate a substantially circular spray pattern having substantially the same droplet form as that of the diffuser element 42, even though the water output capacity is significantly less. The residual areas 42f are somewhat smaller, and have curved sides corresponding to the sides of the grooves 42e'.

With reference to FIG. 10, the sprinkler head 16 is quickly and easily assembled by first placing the diffuser 40 between the bearing member 21 and circular housing member 22, and thereafter inserting the shaft 41 into the recess 21a. The water jet means 60 is then snapped into place from the bottom of housing member 22, through the large threaded bore 22a. The diffuser seating element 40 is dimensioned for a frictional fit in the preferred embodiment, and will stay in place when it has reached its proper position.

Lastly, the threaded coupling 80 is screwed into the threaded bore 22a until the water jet means 60 creates a tight, leakproof seal with the housing member 22. The square shank 83 permits the use of a wrench for this operation, and also for tightening the entire sprinkler head 16 when the nipple 82 is screwed into the conduit arm 12.

The number and size of sprinkler heads 16 is chosen as a function of the unique characteristics of each field to be irrigated. However, should modification be necessary in the field, this is easily accomplished by disassembling the sprinkler head or heads that require modification, and substituting the appropriate diffuser and diffuser seating element.

In operation, water entering the nipple 82 passes through the axial bore 85 and cylindrical bore 84 until it reaches the water jet means 60. At this point, it passes through and is regulated by the resilient washer 64, and is formed into an upwardly directed water jet that impinges on the undersurface of the diffuser element 42. In the absence of pressure, the diffuser element 42 remains in the position shown in FIG. 3 by gravity, protectably covering the central aperture 61b and thus precluding the entry of dirt, bugs, and the like. In the presence of water pressure, however, it is forced upward, with the top of shaft 41 reaching its upper limit as defined by the top of recess 21a. This is the operational position of diffuser 40.

The resilient washer 64 is designed to resiliently deform over a predetermined range of pressures. In the lower range, the washer 64 maintains its normal form, with the central aperture 64b remaining substantially the same over the washer thickness. Accordingly, the washer 64 presents a control opening to the inlet water which is of maximum size to permit the greatest volume of water to pass therethrough. However, at the higher end of the pressure range, the washer 64 deforms relative to the central aperture 61b, and the central aperture or control opening 64a of the washer 64 becomes more and more restrictive on the inlet side. This has the effect of restricting the volume of water passing through the central aperture 61b, which serves as the water jet outlet. However, the volume of water is essentially the same, since the pressure is decreased to deliver the same amount of water through the smaller passage.

Between the lowest and highest water pressures, the resilient washer 64 deforms in a modulating manner so that the proper volume of flow always leaves the central aperture 61b.

It will be observed that the resilient washer 64 is disposed immediately adjacent the central aperture 61b which serves as the outlet for the water jet means 60. This position is of significance since the downstream side of the washer 64 is always exposed to atmosphere during operation. Because atmospheric pressure is constant insofar that operation of the sprinkler head 16 is concerned, it is only the pressure exposed to the undersurface of the resilient washer 64 that causes it to flex. This is in distinction to prior art devices in which the resilient washer is spaced from the outlet, where its downstream face may be subjected to back pressure which adversely affects proper operation of the washer 64.

The jet of water strikes the tip 42b of diffuser element 42 and is evenly distributed upward and radially outward into the grooves 42e. The smooth transition from upward to outward movement by the water prevents undesired impact and misting, and also optimizes formation of the water into a spray pattern of maximum size. The grooves 42e generate a substantially circular flow pattern, with the water passing through each groove 42e passing slightly upward and radially outward into water droplets that are large enough to resist being blown off course by the wind, but not so large as to damage the crop of the field.

As constructed, each spray head 16 uniformly distributes a substantially constant volume of water on the crop over which it passes with a minimum loss of water due to evaporation or blowing by the wind.

As pointed out above, the irrigation system is custom designed to the field through the appropriate selection of sprays heads 16 to accomplish the objective of uniform water distribution in the proper amount. The water distributing capacity of the spray heads 16 generally increases as a function of radial distance from the center pivot 13. However, this is not necessarily a linear relationship. For example, if the field to be irrigated includes areas of appreciable difference in elevation, it may be desirable to provide spray heads 16 capable of delivering greater volumes of water in the higher areas, and spray heads 16 capable of delivering lesser volumes of water for the lower areas. This of course would take into account the anticipated water runoff from the higher to lower areas.

Water supplied to the irrigation system 11 at the center pivot 13 is preferably at a relatively low pressure, on the order of 30 psi. The system is designed for a minimal pressure drop from the center to the outermost point in the conduit arm 12, with the system on flat ground. Stated otherwise, essentially uniform pressure appears at each of the spray heads 16 where there is no difference in elevation over the length of the conduit arm. Thus, when differences in elevation appear, such as between the towers 14a and 14f of FIG. 1, the resilient washer 64 of each spray head 16 will deform appropriately to maintain a constant volume of water from the outlet 61b. This ensures that the proper amount of water falls on the annular area which a particular spray head 16 overlies.

The diffuser 40 ensures that the constant volume of water is uniformly and efficiently distributed. As described, each of the spray heads 16 delivers a substantially circular spray pattern of water droplets which act like a gentle rain without misting or fogging, thus avoiding excessive evaporation of the water before it reaches the ground. With less evaporation, less water is needed, which conserves energy as well as water.

The system will operate under high as well as low water pressures without wasting water, but low pressure operation is preferred because it consumes less energy while effecting substantially the same results.

FIGS. 11 and 12 disclose an insert member 90 for the sprinkler head 60 that is designed to absorb the shock or impact of water travelling into the sprinkler head at high speed. This phenomenon is generally known as "water hammer", and even in low pressure center pivot irrigation systems, it can generate substantial pressure forces within the system and cause damage to the individual sprinkler heads 16 or to the conduit arm itself. The combined effect of shock absorbers in each of the sprinkler heads 16 has been found to overcome the problem of water hammer even when the system operates at higher pressures.

Insert member 90 is integrally molded from plastic, an acetal copolymer also being the preferred material, and is generally annular in configuration. The insert member 90 includes inner and outer cylindrical walls 91, 92 that are commonly connected at their top circular edges by an annular wall member 93.

The outside diameter of the insert member 90, as defined by the outer wall member 92, is chosen to permit the insert member 90 to fit snugly within the large cylindrical bore 84 of the threaded coupling 80 (FIG. 11). The axial dimension or height of the insert member 90 is such that it occupies all of the vertical space of the cylindrical bore 84. Thus, the lower edge of the outer wall member 92 rests on the bottom surface of the cylindrical bore 84, and the annular wall member 93 engages the lower surface of the water jet means 60.

The wall members 91, 92 are spaced radially to define an annular chamber 94 that is open at its lower end and closed at its upper end. As best shown in FIG. 11, the axial dimension of the inner wall 91 is less than that of the outer wall member 92, so that the annular chamber 94 is in fluid communication with the axial bore 85 leading upward from the threaded nipple 82. The inside diameter of the inner wall member 91 corresponds with that of the axial bore 85.

As constructed, and with the center pivot irrigation system 11 shut off, the sprinkler heads 16 are in the position shown in FIG. 11. In this position, water drains from the sprinkler heads 16 into the conduit arm 12.

When the system 11 is turned on, water traveling through the conduit arm 12 enters the axial bore 85 and travels upward. Because the water moves quite rapidly, air is trapped in the annular chamber 94, and although the water continues upward through the inner wall member 91, the entrapped air acts as a cushion to the noncompressible water and thus absorbs the shock and avoids the water hammer that would otherwise exist. When the system is shut down again, water again drains from the sprinkler heads 16, including the annular chamber 94, so that air may again be entrapped when the system is next operated.

Although the system 11 is shown with the sprinkler head 16 in an upright position, with the water jet issuing upwardly for impingement on the undersurface of diffuser element 40, it is possible for the sprinkler heads 16 to be mounted in a position which is upside down relative to that shown. In this case, it is preferred that the insert member 90 be inserted in a position opposite that shown in FIG. 11, so that the annular chamber 94 opens toward the water jet means 60. In this manner, air will still be entrapped in the annular chamber 94 so that the water impact will be absorbed as before. In addition, however, this reversal of position of the insert member 90 enables the annular chamber 94 to be drained, such draining occurring through the water jet means 60 onto the ground below.

Operation of the sprinkler heads 16 with the insert member 90 in either position is otherwise the same as described above.

What is claimed is:

1. A spray head device for use in center pivot irrigation systems for distributing a spray of water, comprising:
   frame means defining an upper carrying member and a lower housing disposed in spaced relation, the lower housing adapted for connection to a source of water;
   water jet means carried by the lower housing defining an inlet for receiving water and an outlet of predetermined size constructed to issue a jet of water, the outlet disposed in opposition to the upper carrying member;
   volume control means associated with the water jet means for controlling the jet of water so that its volume output is substantially constant, the volume control means comprising a resilient washer retained within the water jet means and having a control opening disposed in alignment with and immediately adjacent the outlet of said water jet means, the resilient washer having a normal unstressed state in which the control opening permits the flow of a maximum volume of water, and the range of stress states in which the control opening becomes progressively restrictive, the resilient washer being disposed within the water jet means so that the incoming water acts on and stresses the water as a function of water pressure;

and diffuser means supported by said upper carrying member in overlying relation to the housing outlet for impingement by the jet of water and constructed to disperse the water radially outward into a flow pattern of predetermined configuration, the diffuser means comprising a circular member having a peripheral edge and defining an undersurface that tapers axisymmetrically to split the jet of water substantially evenly and deflect it laterally outward over the undersurface, said undersurface having a plurality of grooves formed therein which extend radially outward to said peripheral edge.

2. The spray head device defined by claim 1 wherein the cross-sectional size of the control opening is smaller than that of the outlet of the housing means to facilitate the progressively restrictive movement of the resilient washer through said range of stress states.

3. A spray head device of rated volume flow for distributing a spray of water, comprising:

an enclosed housing comprising first and second separable, cooperating housing members, the first housing member defining an inlet adapted for connection to a source of water;

water jet means configured to be removably retained between the first and second housing members, the water jet means defining an internal chamber, an inlet for receiving water from the enclosed housing inlet and an outlet aligned with said inlet which is constructed to issue a jet of water and sized for a predetermined range of volume flow;

the water jet means further comprising a resilient washer retainably disposed within said internal chamber and having a control opening disposed in alignment with said outlet, the resilient washer having a normal unstressed state in which the control opening permits the flow of a maximum volume of water, and a range of stress states in which the control opening becomes progressively restrictive, the resilient washer being disposed within said internal chamber so that increasing water acts on and stresses the washer as a function of water pressure, whereby the volume output of the water jet means is substantially constant;

frame means connected to the enclosed housing and defining a carrying member disposed in spaced relation to the outlet of the water jet means;

a diffuser element retainably carried by the carrying member in overlying relation to the water jet means outlet, the diffuser element being disposed for impingement by the jet of water and constructed to disperse the water radially outward into a flow pattern of predetermined configuration, the diffuser element being configured relative to the range of volume flow of the water jet means;

the water jet means and diffuser being removably and interchangeably carried by the enclosed housing and frame means, respectively, whereby the rated volume flow of the spray head may be varied.

4. A spray head device defined by claim 3, wherein the control opening of the resilient washer, and the inlet and outlet of the water jet means are circular.

5. The spray head device defined by claim 3, wherein the cross sectional size of the control opening is smaller than that of the outlet of the water jet means to facilitate the progressively restrictive movement of the resilient washer through said range of stress states.

6. The spray head device defined by claim 5, wherein the cross sectional size of the inlet of the water jet means is greater than that of the outlet.

7. The spray head device defined by claim 3, wherein the enclosed housing has a predetermined internal configuration, and the water jet means has an external configuration conforming to that of the enclosed housing.

8. The spray head device defined by claim 7, wherein:

the second housing member comprises a wall member through which a bore is formed, the bore being disposed in axial alignment with said diffuser element;

and the water jet means comprises an axial projection sized and configured to extent outwardly of the second housing member through said bore;

and a peripheral flange extending radially outward of the axial projection, said flange constructed and arranged to seat on the internal face of said wall member;

said first and second housing members being constructed to sealably retain the water jet means therebetween.

9. The spray head device defined by claim 8, wherein:

the second housing member further comprises an inner threaded cylindrical face;

and the first housing member comprises a hollow coupling member having an external cylindrical threaded surface, the coupling member constructed to screw into the second housing member and to urge the flange of the water jet means against said wall member.

10. The spray head device defined by claim 9, wherein the coupling member defines an internal passageway leading to said water jet means.

11. The spray head device defined by claim 10, wherein the coupling member comprises a threaded nipple for sealable connection to a source of water.

12. The spray head device defined by claim 3, wherein the water jet means comprises first and second elements in which the inlet and outlet are respectively disposed in axial alignment, said first and second elements being cooperably constructed to define said internal chamber therebetween.

13. The spray head device defined by claim 3, wherein the frame means and water jet means are constructed to issue the jet of water vertically upward, and the diffuser element is disposed to disperse the jet of water laterally outward into said flow pattern.

14. The spray head device defined by claim 3, wherein the diffuser element is carried by the carrying member of the frame means for movement relative to the outlet of the water jet means between a first position protectively covering the outlet and a second position spaced from the outlet in which the flow patern is created.

15. The spray head device defined by claim 14, wherein the diffuser element is movable from the first position to and maintained in the second position by said jet of water, and returnable to the first position in the absence of said jet of water under the influence of gravity.

16. The spray head device defined by claim 15, wherein the diffuser element comprises a shaft member carried for sliding movement by said carrying member between the first and second positions.

17. The spray head device defined by claim 3, wherein the frame means further comprises spaced, opposed side members interconnecting the enclosed housing and carrying member, the side members having longitudinally extending inner edges that taper to a point.

18. The spray head device defined by claim 17, wherein the diffuser element comprises a circular member defining an undersurface that tapers axisymmetrically to a central point, the undersurface having formed therein a plurality of radially extending grooves.

19. The spray head device defined by claim 18, wherein the undersurface of the diffuser element includes a pair of diametrically opposed regions void of radially extending grooves, said regions being disposed respectively adjacent the tapered inner edges of said opposed side members.

20. The spray head device defined by claim 3, wherein the diffuser element comprises a circular member defining an undersurface that tapers axisymmetrically to a central point, the point constructed and disposed to evenly split the jet of water and deflect it laterally over the undersurface of the circular member.

21. The spray head device defined by claim 20, wherein a plurality of radially extending grooves are formed in the undersurface of the circular member.

22. The spray head device defined by claim 21, wherein said undersurface comprises regions void of said grooves to control the configuration of said flow pattern.

23. The spray head device defined by claim 22, wherein the circular member comprises two of said void regions of generally triangular configuration, said void regions being diametrically opposed on said undersurface.

24. The spray head device defined by claim 3, wherein the diffuser element further comprises means cooperative with the frame means for preventing its rotation.

25. The spray head device defined by claim 3, wherein the water jet means and diffuser element comprise coding means for identifiably relating a diffuser element and water jet means which are operatively matched.

26. The spray head device defined by claim 25, wherein said coding means comprises a common color for a diffuser element and water jet means that are operatively matched.

27. The spray head device defined by claim 3, wherein the enclosed housing, frame means, water jet means and diffuser element are configured and dimensioned so that removal of the diffuser element is conditioned on removal of the water jet means.

28. The spray head device defined by claim 27, wherein said diffuser element is retained between the water jet means and said carrying member.

29. The spray head device defined by claim 3, which further comprises means associated with the enclosed housing for absorbing the impact of water entering the device.

30. The spray head device defined by claim 29, wherein the first housing member comprises a water inlet passage leading to the inlet of said water jet means, and said absorbing means comprises structural means defining an air chamber communicating with said water inlet passage.

31. The spray head device defined by claim 30, wherein said structural means comprises a removable insert member disposed between said water inlet passage and the water jet means, the insert member comprising spaced inner and outer cylindrical wall members commonly connected by an annular member to define said air chamber therebetween.

32. The spray head device defined by claim 31, wherein said inner cylindrical wall member is disposed in substantial alignment with said water inlet passage and the inlet of said water jet means.

33. The spray head device defined by claim 32, wherein the axial dimension of the inner cylindrical wall member is less than that of the outer cylindrical wall member.

34. A spray head device for distributing a spray of water, comprising:
enclosed housing means defining an internal chamber, a fluid inlet adapted for connection to a source of water for receiving water into the chamber and an outlet constructed and arranged to issue a jet of water therefrom;
nonrotatable diffuser means disposed for impingement by the jet of water and constructed to disperse the water radially outward into a flow pattern of predetermined configuration;
and frame means associated with the housing means for carrying the diffuser means in overlying relation to the outlet of the housing means, the frame means comprising spaced, opposed side members interconnected by a carrying member from which the diffuser means is suspended;
the diffuser means comprising
a circular member having a peripheral edge and defining an undersurface that tapers axisymmetrically to a central point, the central point being constructed and disposed to split the water substantially evenly and deflect it laterally outward over at least a part of the undersurface of the circular member;
a plurality of grooves formed in the undersurface of the circular member extending radially outward to said peripheral edge;
and a pair of diametrically opposed regions on said undersurface void of said radially extending grooves, said void regions being disposed respectively adjacent the opposed side members.

35. The device defined by claim 34, wherein:
the diffuser means further comprises a shaft projecting axially from said circular member opposite the direction of said central point;
and the carrying member of said frame means is formed with a centrally disposed bore for retainably receiving said shaft.

36. The device defined by claim 35, wherein the circular member comprises a flat surface disposed opposite said undersurface, the shaft projecting from said flat surface.

37. The device defined by claim 35, wherein the shaft is slidably retained within said bore to permit movement of the diffuser means relative to the outlet of the housing means between a first position protectively covering the outlet and a second position spaced from the outlet in which the flow pattern is created.

38. The device defined by claim 37, wherein the diffuser means is movable from the first position to and maintained in the second position by said jet of water, and returnable to the first position in the absence of said jet of water under the influence of gravity.

39. The device defined by claim 38, wherein said central point enters said outlet in said first position.

40. The device defined by claim 34, wherein the housing means further comprises a threaded nipple defining said inlet.

41. The device defined by claim 40, wherein the housing means further comprises at least two opposed, flat surfaces disposed proximate the threaded nipple, whereby the device may be installed through the use of a wrench or the like.

42. The device defined by claim 34, wherein said void regions are of generally triangular configuration.

43. The device defined by claim 34, wherein said grooves extend radially outward from a region which is radially remote from the central point of said undersurface.

44. The device defined by claim 43, wherein each of said void regions is of generally triangular configuration and extends from a point radially remote from said central point to said peripheral edge.

45. The device defined by claim 34, wherein the opposed side members have longitudinally extending inner edges that taper to a point.

46. The device defined by claim 45, wherein the opposed side members are integrally formed with at least a portion of said enclosed housing means.

47. The device defined by claim 46, wherein the opposed side members, carrying member and housing means are formed from plastic.

48. The device defined by claim 34, which further comprises a resilient washer disposed within said internal chamber and having a control opening disposed in alignment with said outlet, the resilient washer having a normal unstressed state in which the control opening permits the flow of a maximum volume of water, and a range of stress states in which the control opening becomes progressively restrictive, the resilient washer being disposed within the internal chamber so that incoming water acts on and stresses the washer as a function of water pressure, so that the volume output of the spray head device is substantially constant.

49. The device defined by claim 48, wherein the resilient washer is retainably disposed within said internal chamber.

* * * * *